US012662061B2

(12) United States Patent
Williams et al.

(10) Patent No.: US 12,662,061 B2
(45) Date of Patent: Jun. 23, 2026

(54) VEHICLE CARGO SYSTEM WITH RAIL AND CLAMP

(71) Applicant: Toyota Motor Engineering & Manufacturing North America, Inc., Plano, TX (US)

(72) Inventors: Paxton S. Williams, Milan, MI (US); Scott Louis Frederick, Brighton, MI (US); Ryan C. Harris, Saline, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 72 days.

(21) Appl. No.: 18/659,128

(22) Filed: May 9, 2024

(65) Prior Publication Data

US 2025/0346193 A1 Nov. 13, 2025

(51) Int. Cl.
B60R 9/06 (2006.01)
B60P 3/40 (2006.01)

(52) U.S. Cl.
CPC . B60R 9/06 (2013.01); B60P 3/40 (2013.01)

(58) Field of Classification Search
CPC .... B60R 9/10; B60R 9/06; B60R 9/00; B62D 33/0273; B60P 3/40
See application file for complete search history.

(56) References Cited

U.S. PATENT DOCUMENTS

| | | | |
|---|---|---|---|
| 6,913,175 B2 | 7/2005 | Martin | |
| 6,986,541 B1 | 1/2006 | Haack | |
| 6,994,363 B2 | 2/2006 | Seksaria et al. | |
| 7,296,837 B2 | 11/2007 | Niedziela et al. | |
| 7,971,919 B2 | 7/2011 | Vertanen | |
| 9,981,700 B1 | 5/2018 | Garrison et al. | |
| 10,589,796 B1 | 3/2020 | Salvia, III | |
| 2004/0227368 A1* | 11/2004 | Seksaria | B60P 3/40 296/57.1 |
| 2008/0231075 A1* | 9/2008 | Plavetich | B60P 3/06 296/183.1 |
| 2013/0026202 A1* | 1/2013 | Williams | B60R 9/06 224/405 |
| 2018/0215323 A1* | 8/2018 | Frederick | B62D 33/0207 |

(Continued)

FOREIGN PATENT DOCUMENTS

| | | |
|---|---|---|
| DE | 202019005265 U1 | 2/2020 |

*Primary Examiner* — Derek J Battisti

(74) *Attorney, Agent, or Firm* — Christopher G. Darrow; Darrow Mustafa PC

(57) ABSTRACT

Various embodiments described herein relate to cargo systems for vehicles. A cargo system includes a rail stowable in a rail channel extending between a first and second side of a floor. The rail defines a rail body extending, at least partially, between the first side and the second side substantially parallel to the floor. The rail also defines rail legs rotatably connected to the floor. The rail further defines an aperture opening along a direction of the rail legs. The cargo system further includes a clamp. The clamp includes a clamp body configured for installation to the aperture. The clamp also includes a clamp arm extending from the clamp body in a direction along the rail. The clamp further includes a ratchet system that fastens the clamp body to the rail to secure a cargo item between the clamp arm and the rail.

9 Claims, 3 Drawing Sheets

(56) References Cited

U.S. PATENT DOCUMENTS

| | | | | |
|---|---|---|---|---|
| 2021/0078645 A1* | 3/2021 | Hanson | .................. | B62D 43/06 |
| 2022/0032854 A1* | 2/2022 | Burke | ....................... | B60R 9/10 |
| 2023/0040098 A1* | 2/2023 | Hoogendoorn | ......... | B60R 11/06 |
| 2024/0294214 A1* | 9/2024 | Ruhs | ........................ | B25H 1/04 |
| 2024/0300591 A1* | 9/2024 | Boisvert | .................. | B60R 7/02 |

* cited by examiner

VEHICLE CARGO SYSTEM WITH RAIL AND CLAMP

TECHNICAL FIELD

The present disclosure relates generally to cargo systems for vehicles and, more particularly, to securing cargo to vehicles.

BACKGROUND

Users of vehicles such as pickup trucks often use a bed of the vehicle to transport long cargo items, such as plywood planks, sheets of drywall, skis, etc. In some instances, though, the cargo may be longer than the bed and thus may not lay flat within the bed. Such items may become warped and/or damaged when not stored flat within the bed. Moreover, during use of the vehicle, cargo items may move around within the bed, also causing damage to the cargo items. Some users can utilize devices such as ratchet straps to secure cargo within the bed. However, ratchet straps typically require connection to multiple points within the bed, and may not provide a high enough clamping force, for example, on thin, flat items such as plywood planks, that is necessary to prevent such items from shifting within the bed.

SUMMARY

Various embodiments described herein relate to cargo systems for securing cargo to vehicles. As mentioned above, some users of vehicles transport long cargo items within cargo areas of the vehicle, for example, trailers, vans, box trucks, pickup truck beds, etc. In some instances, the cargo may not lay flat within the cargo area. Moreover, in some instances, cargo may shift within the vehicle when not secured. Accordingly, in one exemplary arrangement, a vehicle includes a cargo system for levelly securing cargo within a cargo area of a vehicle.

In one arrangement, the cargo system includes one or more rails that are connected to a floor of a cargo area of a vehicle. The rails rotate between a use position, in which the rails are raised above the floor, and a stowed position, in which the rails are stored in rail channels defined by the floor. In the use position, a cargo item can be stored on top of the rail within the cargo area. In some instances, moreover, a cargo item can be secured to the rails using one or more clamps having ratchet systems.

In one configuration, a clamp includes a ratchet system with a pawl, ratchet teeth, and a release mechanism. In one example, the rail is hollow, and the pawl is provided in the hollow rail, for example, by being connected to an inside surface of the rail by a spring. Additionally, in one configuration, the rail defines an aperture that receives the clamp, and the pawl extends at least partially into the aperture to engage ratchet teeth defined by the clamp. The ratchet teeth allow the clamp to be positioned within the aperture at a height corresponding to a thickness of a cargo item, for example, a thickness of a plywood plank. The release mechanism is provided within the clamp to disengage the pawl from the ratchet teeth so that the clamp can be removed from the rail when not in use. In this way, the clamp provides the benefit of securing cargo to the rail so that it does not slide within the cargo area, thereby preventing damage to the cargo.

In some instances, the cargo area defines a floor that is not generally flat. For example, the cargo area can be a bed of an electric pickup truck, and the bed can define a step that houses a vehicle component such as a battery pack. In such instances, the rails can have a similar height as the step such that the rails and the step work together to support cargo in a substantially level configuration with respect to the floor. In this way, the cargo system can secure cargo items levelly within the bed to prevent the cargo items from warping or bending.

Accordingly, these arrangements have the benefit of providing a cargo system for a vehicle cargo area that facilitates storing and securing of cargo within the cargo area in a substantially level configuration such that the cargo does not warp, shift within the vehicle, or otherwise become damaged or move within the bed while the vehicle is in motion.

In one embodiment, a cargo system for a vehicle includes a rail stowable in a rail channel extending between a first and second side of a floor. The rail defines a rail body extending, at least partially, between the first side and the second side substantially parallel to the floor. The rail also defines rail legs rotatably connected to the floor. The rail further defines an aperture opening along a direction of the rail legs. The cargo system further includes a clamp. The clamp includes a clamp body configured for installation to the aperture. The clamp also includes a clamp arm extending from the clamp body in a direction along the rail. The clamp further includes a ratchet system that fastens the clamp body to the rail to secure a cargo item between the clamp arm and the rail.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Various embodiments described herein relate to cargo systems for securing cargo to vehicles. As mentioned above, some users transport long cargo items within cargo areas of the vehicle, for example, trailers, vans, box trucks, pickup truck beds, etc. In some instances, the cargo may not lay flat within the cargo area because of irregularities in a floor of the cargo area. Moreover, in some instances, cargo may shift within the vehicle when not secured. Accordingly, in one exemplary arrangement, a vehicle includes a cargo system for securing cargo within a cargo area of a vehicle.

In one arrangement, the cargo system includes one or more rails that are connected to a floor of a cargo area of a vehicle. The rails rotate between a use position, in which the rails are raised above the floor, and a stowed position, in which the rails are stored in rail channels defined by the floor. In the use position, a cargo item can be stored on top of the rail within the cargo area. In some instances, moreover, a cargo item can be secured to the rails using one or more clamps having ratchet systems.

In one configuration, a clamp includes a ratchet system with a pawl, ratchet teeth, and a release mechanism. In one example, the rail is hollow, and the pawl is provided in the hollow rail, for example, by being connected to an inside surface of the rail by a spring. Additionally, in one configuration, the rail defines an aperture that receives the clamp, and the pawl extends at least partially into the aperture to engage ratchet teeth defined by the clamp. The ratchet teeth allow the clamp to be positioned within the aperture at a height corresponding to a thickness of a cargo item, for example, a thickness of a plywood sheet or wood plank. The release mechanism is provided within the clamp to disengage the pawl from the ratchet teeth so that the clamp can be removed from the rail when not in use. In this way, the clamp provides the benefit of securing cargo to the rail so that it does not slide within the cargo area, thereby preventing damage to the cargo.

In some instances, the cargo area defines a floor that is not generally flat. For example, the cargo area can be a bed of an electric pickup truck, and the bed can define a step that houses a vehicle component such as a battery pack. In such instances, the rails can have a similar height as the step such that the rails and the step work together to support cargo in a substantially level configuration with respect to the floor. In this way, the cargo system can secure cargo items levelly within the bed to prevent the cargo items from warping or bending.

Figure 1:
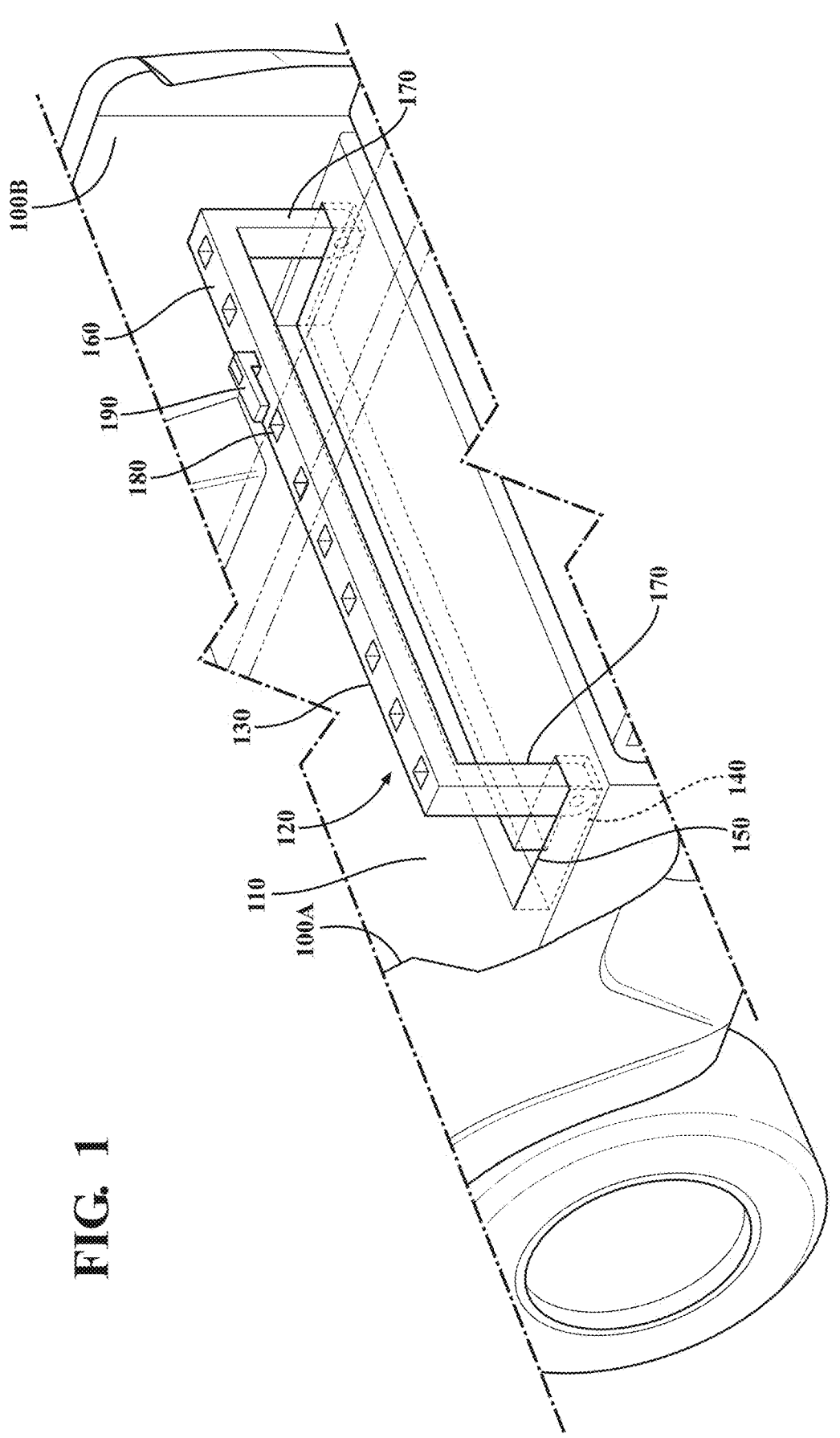
FIG. 1 shows one embodiment of a cargo system for a vehicle.

Referring now to FIG. 1, a portion of a vehicle is illustrated. The vehicle is a vehicle with a cargo area, such as a pickup truck with a bed, a semi-truck, a cargo van, a flatbed trailer, etc. The vehicle, in one arrangement, includes two sides, for example, a first side 100A and a second side 100B, at least partially enclosing the cargo area. In instances in which the vehicle is a pickup truck, the sides are sidewalls of the pickup truck. In other instances, the sides can be walls of a cargo van or semi-truck trailer, side edges of a flatbed trailer, or other structures that may enclose or otherwise delineate a cargo area of a vehicle. Between the sides, in one configuration, the vehicle defines a floor 110. In instances in which the vehicle is a pickup truck, the floor 110 is a bed of the pickup truck. In other instances, the floor 110 is a floor of a cargo van or semi-truck, the bed of a flatbed trailer, etc. The floor 110 extends between the first side 100A and the second side 100B and provides a cargo area for cargo to be stored and/or transported by the vehicle.

In one arrangement, for example, as shown, the cargo system includes a rail 120. The rail 120 provides a raised surface on which cargo can be supported for storage and/or transport and to which cargo can be secured. In some instances, the cargo includes flat, elongated items that may be subject to bending, warping, or other damage when stored and/or transported on the floor 110. For example, as shown, the cargo is a plywood plank, but other cargo that may be subject to damage includes sheets of drywall, skis, and other flat and elongated items. Accordingly, the rail 120 provides a sturdy surface raised above the floor 110 that flat, elongated cargo can be laid on and fixed to in order to be stored and/or transported within the vehicle to minimize the risk of damage to the cargo. Moreover, the rail 120 provides a securing point for the cargo such that it does not shift within the cargo area, thereby also preventing damage to the cargo.

In some instances, the rail 120 is movable between a use position 130 and a stowed position 140, both of which are shown in FIG. 1. In the use position 130, the rail 120 is raised above the floor 110 for storing cargo on top of the rail 120. In the use position 130, the rail 120 is positioned at a rail height, as described in further detail below. In the stowed position 140, the rail 120 is stowed inside a rail channel 150. In one example, the rail channel 150 is a recess defined by the floor 110 that substantially matches the shape and size of the rail 120 such that the rail 120 can be stowed inside the rail channel 150. In some instances, the rail channel 150 has a depth beneath the floor 110 that substantially matches a thickness of the rail 120 such that, when the rail 120 is stowed inside the rail channel 150, the rail 120 is substantially flush with the floor 110. In this way, when the rail 120 is in the stowed position 140, the rail 120 does not inhibit regular use of the floor 110 for storage.

The rail 120, in one configuration, defines a rail body 160 and rail legs 170 connected to the rail body 160. The rail body 160 provides a storage surface for the cargo, while the rail legs 170 connect the rail body 160 to the floor 110 and facilitate movement of the rail body 160 from the use position 130 to the stowed position 140. The rail body 160 and/or the rail legs 170 can define a substantially square-shaped cross-section (as shown) or a substantially rectangular-shaped cross-section, in some examples. A cross-section having a shape with substantially right angles allows the rail 120 to have a flat surface in the use position 130 for storing cargo on top of the rail 120. Moreover, a cross-section having a shape with substantially right angles allows the rail 120 to continue the flat surface of the floor 110 when the rail 120 is in the stowed position 140.

The rail body 160 and the rail legs 170, in one arrangement, are unitarily formed as a single component. In other arrangements, the rail body 160 and the rail legs 170 are formed as separate components that are later attached together. Moreover, the rail body 160 and the rail legs 170, in one example, are formed from a high-strength material such as steel, carbon fiber, etc. Each of the rail body 160 and the rail legs 170 will be described in turn below.

In one arrangement, the rail body 160 extends at least partially between the first side 100A and the second side 100B substantially parallel to the floor 110. Moreover, the rail body 160 extends, in some instances, at least partially between the first side 100A and the second side 100B substantially perpendicular to the first side 100A and the second side 100B such that elongated cargo is stored substantially extending in the same direction as the first side 100A and the second side 100B. For example, in instances in which the vehicle is a pickup truck, the rail body 160 extends between the sidewalls such that elongated cargo is stored in the bed generally along a longitudinal direction of the pickup truck (i.e., in a direction from a bulkhead of the pickup truck to a tailgate of the pickup truck).

The rail legs 170, in one arrangement, are rotatably connected to the floor 110. In one example, the rail legs 170 are rotatably connected to the floor 110 within the rail channel 150. In some instances, the rail legs 170 are connected to the floor 110 using hinges, however, rotatable connection of the rail legs 170 to the floor 110 can be achieved through other types of connectors as well. In any case, by way of being rotatably connected to the floor 110, the rail legs 170 can rotate about the connection to move the rail body 160 between the use position 130 and the stowed position 140. In one configuration, in the use position 130, the rail legs 170 are positioned substantially parallel to the floor 110. On the other hand, in the stowed position 140, the rail legs 170 are stowed in the rail channel 150. As shown in FIG. 1, in one configuration, the rail 120 is connected to the floor 110 in a manner in which the rail 120 rotates in a direction toward the right side of the page. However, in other configurations, the rail 120 can be connected to the floor 110 in a manner in which the rail 120 rotates in a direction toward the left side of the page. In any case, the floor 110 can define the rail channel 150 in a manner such that the rail channel 150 aligns with the rail 120 in whichever direction the rail 120 is orientated for rotation. Additionally, in any case, in some instances, the rail legs 170 can be rotatably connected to the floor 110 in a locking manner such that the rail body 160 can be locked in the use position 130. In one example, accordingly, the hinges can include locking mechanisms such as pins to retain the rail body 160 in the use position 130.

In some instances, as mentioned above, it is advantageous to provide a user of the cargo system with a means for securing cargo items to the rail 120. Accordingly, in one arrangement, the rail body 160 defines one or more apertures 180, and the cargo system includes one or more clamps 190 that secure cargo items to the rail 120 when inserted into the aperture(s) 180. More specifically, in one configuration, the clamp(s) 190, when inserted into the aperture(s) 180, overlie a cargo item supported by the rail 120 and provide a clamping force that presses the cargo item against the rail 120 to secure the cargo item to the rail 120. Examples of an aperture 180 and a clamp 190 will be described in turn in further detail below in connection with FIG. 2.

Figure 2:
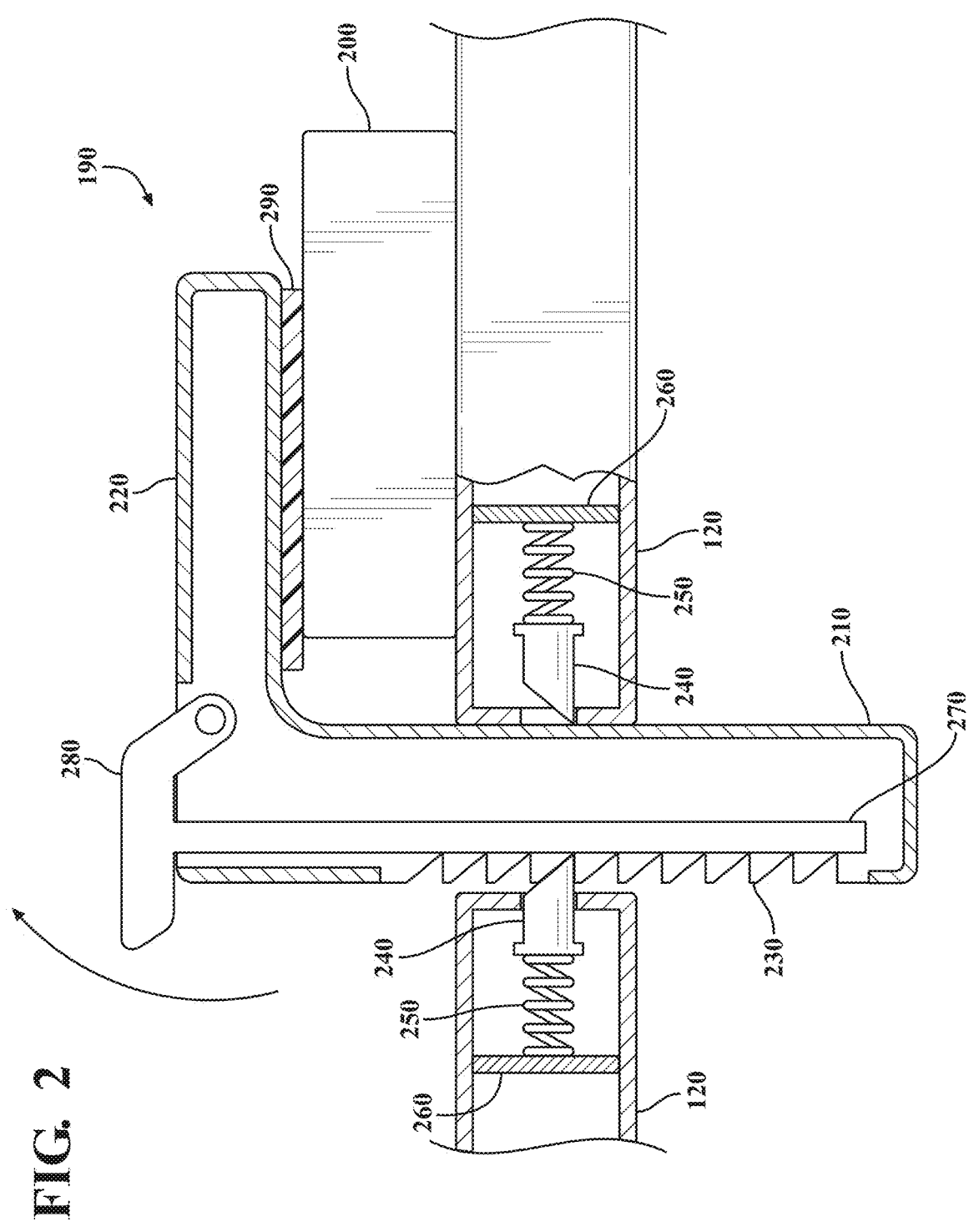
FIG. 2 shows one embodiment of a clamp and a rail of the cargo system.

Referring now to FIG. 2, an example cross-sectional view of the cargo system is shown. As shown, the clamp 190 is inserted into the aperture 180 to clamp a cargo item 200 to the rail 120. As shown, the cargo item 200 is a plywood plank. However, it should be understood that the clamp 190 can be inserted into the aperture 180 to secure other flat, elongated cargo to the rail 120. In one configuration, the clamp 190 includes a clamp body 210 and a clamp arm 220. The clamp body 210, in one arrangement, is inserted to the aperture 180 while the clamp arm 220, in one arrangement, extends from the clamp body 210 and overlies the cargo. A clamping force is applied to the cargo item 200 using additional features of the clamp 190 described in further detail below.

Referring back to the clamp body 210, the clamp body 210 is configured for installation to the rail 120. Accordingly, in one arrangement, the clamp body 210 defines an elongated shape that is sized slightly smaller than the aperture 180 such that the clamp body 210 can be installed to the aperture 180 while still being securely retained by the aperture 180. To be securely retained by the aperture 180, in one arrangement, the clamp body 210 defines a cross-section having a shape substantially similar to the aperture 180. In one example, the aperture 180 is generally rectangularly shaped, and the clamp body 210 defines a similar rectangular cross-section. Moreover, in one configuration, the aperture 180 opens substantially along a direction of the rail legs 170, and when the clamp body 210 is installed to the aperture 180, the clamp body 210 extends substantially along the same direction of the rail legs 170.

As shown in FIG. 1, the rail body 160 defines multiple apertures 180 spaced along the length of the rail body 160. In some instances, it is advantageous to provide multiple apertures 180 to enable a user of the cargo system to choose where to secure a cargo item within the cargo area. In one example, as shown, the rail body 160 defines five apertures 180, but it should be understood that the rail body 160 can define two, three, four, six, etc., apertures 180. In some arrangements, the apertures 180 are spaced along the length of the rail body 160 according to standard widths of common building materials. For example, in one arrangement, the rail body 160 can define two apertures 180 spaced approximately 48 inches apart such that a standard piece of drywall can be clamped to the rail 120. However, other spacings of apertures 180 are possible as well.

Referring back to the clamp arm 220, in one arrangement, the clamp arm 220 extends from the clamp body 210. In some instances, the clamp arm 220 and the clamp body 210 are unitarily formed together as a single component, while in other instances, the clamp arm 220 is formed separately from the clamp body 210 and is later attached to the clamp body 210. The clamp arm 220, in one configuration, extends from the clamp body 210 substantially perpendicularly to the clamp body 210. In other words, in one configuration, the clamp arm 220 extends from the clamp body 210 substantially in a direction along the rail 120. In this way, when the clamp arm 220 and the rail 120 align, and the cargo item 200 is secured between the clamp arm 220 and the rail 120.

As mentioned above, the clamp 190 is configured to apply a clamping force to the cargo item 200 to secure the cargo item 200 to the rail 120. Accordingly, in one arrangement, the clamp 190 includes a ratchet system that fastens the clamp body 210 to the rail 120 and ratchets according to a thickness of the cargo item 200, thereby securing the cargo item 200 to the rail 120. The ratchet system, in one configuration, includes ratchet teeth 230, a pawl 240, and a release mechanism. In one example, the pawl 240 is provided inside the rail body 160 and engages the ratchet teeth 230, which are defined by the clamp body 210, through the aperture 180 to secure the clamp body 210 to the rail 120, and the release mechanism is engaged by the user to release the pawl 240 from the ratchet teeth 230 such that the clamp 190 can be removed from the aperture 180. Each of the components of the ratchet system will be described in further detail below.

Referring now to the pawl 240, in one arrangement, the pawl 240 is provided inside the rail body 160, as mentioned above. Accordingly, in one example, the rail body 160 is substantially hollow. The pawl 240 is located inside the rail 120 such that, when the clamp 190 is not installed to the aperture 180, at least a portion of the pawl 240 extends into the aperture 180. In one instance, the pawl 240 has a tooth-like shape that engages corresponding shapes defined by the clamp body 210, as described in further detail below. Moreover, the pawl 240 is connected to the rail 120 inside the hollow rail body 160. In one arrangement, for example, as shown, the ratchet system includes a spring 250 and a plate 260 that function together to connect the pawl 240 inside the rail body 160. The plate 260, in one example, is a plate 260 that is connected to inner sides of the hollow rail body 160 substantially perpendicular to the direction of the rail body 160. The spring 250, in one arrangement, is connected to the plate 260 and the pawl 240. In this way, the pawl 240 is spring-loaded such that the pawl 240 clicks into the ratchet teeth 230 as the clamp body 210 is installed to the aperture 180.

In one example, the rail body 160 includes one pawl 240, one spring 250, and one plate 260 on one side of the aperture 180. In other instances, for example, as shown, the rail body 160 includes multiple pawls 240, multiple springs 250, and multiple plates 260, for example, one of each component on each side of the aperture 180. Providing one of each component on either side of the aperture 180 thus enables a user to install the clamp 190 to the aperture 180 in varying directions according to the side of the aperture 180 on which the cargo item 200 is located. Moreover, in instances in which the rail body 160 defines multiple apertures 180, the rail body 160 can include a number of pawls 240, springs 250, and plates 260 corresponding to the number of apertures 180 so that the clamp 190 can be used in connection with any of the apertures 180.

Referring now to the ratchet teeth 230, in one configuration, the ratchet teeth 230 are notches defined in the clamp body 210 and extending into the clamp body 210. Moreover, in one arrangement, the clamp body 210 is substantially hollow, and thus the ratchet teeth 230 are hollow as well. The ratchet teeth 230, in one example, have shapes corresponding to the tooth-like shape of the pawl 240. More specifically, in one arrangement, the ratchet teeth 230 each define a curved surface and a flat surface, and the pawl 240 likewise has a curved surface and a flat surface. The curved surfaces of the ratchet teeth 230 engage the curved surface of the pawl 240, while the flat surfaces of the ratchet teeth 230 engage the flat surface of the pawl 240. The curved surfaces of the ratchet teeth 230 allow the pawl 240 to slide by into each notch as the clamp body 210 is inserted into the aperture 180, while the flat surfaces of the ratchet teeth 230 prevent the clamp 190 from being removed from the aperture 180 when the clamp 190 is pulled from a direction above the flat surfaces. The clamp body 210, in one arrangement, defines multiple ratchet teeth 230 such that the clamp body 210 can be positioned at a height in which the clamp arm 220 applies a force to the cargo item 200 in a direction toward the rail 120 in order to secure the cargo item 200 to the rail 120.

Referring now to the release mechanism, the release mechanism is used to disengage the pawl 240 from the ratchet teeth 230 so that the clamp 190 can be removed from the aperture 180. In one arrangement, the release mechanism defines a release mechanism body 270 and a release mechanism handle 280. More specifically, in one configuration, the release mechanism body 270 extends into the hollow clamp body 210 along a direction of the hollow clamp body 210, while the release mechanism handle 280 extends out of the clamp body 210 above the clamp arm 220 such that a user can engage the release mechanism handle 280. In one example, the release mechanism body 270 and the release mechanism handle 280 are unitarily formed as a single component, while in other examples, the release mechanism body 270 and the release mechanism handle 280 are separate components that are attached to each other.

In one arrangement, the release mechanism handle 280 is pivotably connected to the clamp arm 220. In this way, a user can grab the release mechanism handle 280 and rotate the release mechanism by the release mechanism handle 280 in a direction indicated by the arrow in FIG. 2 to disengage the pawl 240 from the ratchet teeth 230. More specifically, in one configuration, the release mechanism body 270, extends along the clamp body 210 adjacent to the ratchet teeth 230 and is configured to rotate into the hollow ratchet teeth 230, thereby pushing the pawl 240 out of the ratchet teeth 230 and disengaging the clamp 190 from the rail 120.

In some instances, the ratchet teeth 230 may not perfectly align with varying thicknesses of cargo items to be secured by the clamp 190. For example, a cargo item 200 may have a thickness that corresponds to a clamp position that is between two ratchet teeth 230. Accordingly, in such instances, it is advantageous to provide a pad 290 between the clamp arm 220 and the cargo item 200 that adds additional thickness to the cargo item 200 that is needed to fully secure the cargo item 200 to the rail 120. The pad 290, in one example, is affixed to the clamp arm 220 on a side of the clamp arm 220 facing the rail 120. The pad 290 can be permanently affixed to the clamp arm 220, which may still aid in providing a clamping force in instances in which the cargo item 200 has a thickness that aligns with one of the ratchet teeth 230, as well as providing additional friction to help further secure the cargo item 200 to the rail 120. In other instances, the pad 290 can be provided separately from the cargo system and inserted between the clamp arm 220 and the rail 120 by the user as needed. The pad 290, in some examples, is a piece of rubber material that provides friction between the clamp arm 220 and the pad 290 as well as between the pad 290 and the cargo item 200. As mentioned above, additional friction can help further secure the cargo item 200 to the rail 120. The pad 290, in other instances, can be another material such as felt, plastic, etc.

Figure 3:
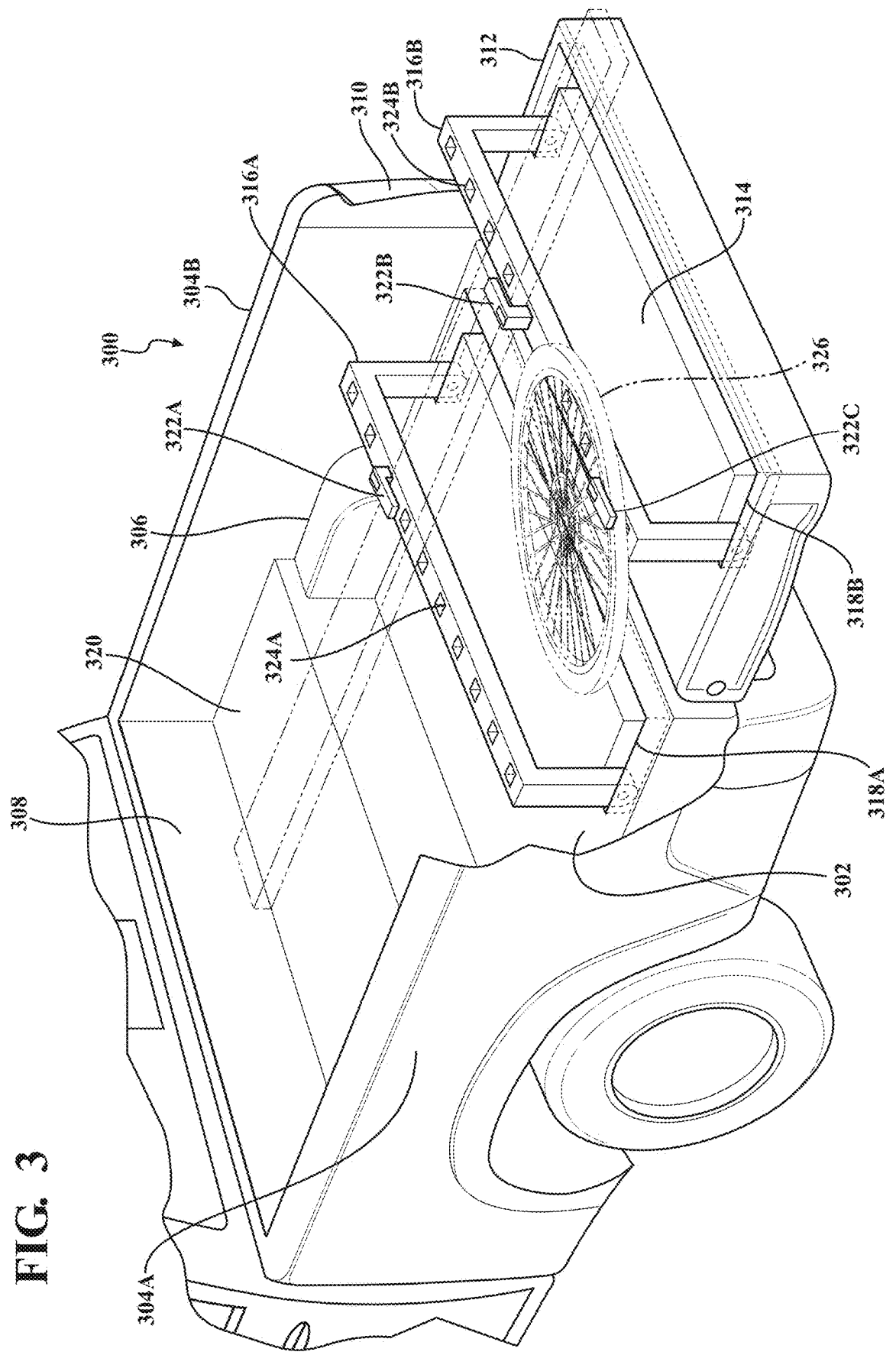
FIG. 3 shows one embodiment of the cargo system implemented in a pickup truck.

As mentioned above, in some instances, the cargo area is a bed of a pickup truck. Referring now to FIG. 3, one embodiment of the cargo system implemented within a pickup truck 300 is shown. The pickup truck 300 includes a body that forms an open-topped bed for carrying cargo. In relation to the bed, the body defines a floor 302, a first side 304A, and second side 304B. In one arrangement, the pickup truck 300 is a left-hand drive vehicle, and the first side 304A corresponds to a driver's side of the vehicle while the second side 304B corresponds to a passenger's side of the vehicle. However, in other arrangements, the first side 304A may correspond to the passenger's side while the second side 304B may correspond to the driver's side. The floor 302 extends between the first side 304A and the second side 304B. In some instances, the floor 302 defines wheels wells 306 that provide a space for rear wheels of the pickup truck 300.

Additionally, the body defines a bulkhead 308 adjacent to a passenger compartment of the pickup truck 300, as well as a tailgate opening 310 and a tailgate 312, both of which are located opposite the bulkhead 308 with respect to a longitudinal direction of the pickup truck 300. The tailgate 312 corresponds to the tailgate opening 310 and, in one arrangement, is pivotally connected to the body for movement, relative to the tailgate opening 310, between a closed position over the tailgate opening 310 and an open position away from the tailgate opening 310. In one arrangement, the tailgate 312 defines a bed-side surface 314, which is a surface of the tailgate 312 that faces the bed when the tailgate 312 is in the closed position. In the open position, the bed-side surface 314 is substantially level with the floor 302. Accordingly, when the tailgate 312 is in the open position, the bed-side surface 314 extends the floor 302 and can be used in the same way as the floor 302.

As shown in FIG. 3, the cargo system includes a first rail 316A connected to the floor 302 and a corresponding first rail channel 318A defined by the floor 302. The first rail 316A and the first rail channel 318A, in one arrangement, are the rail and rail channel described above. Accordingly, the description of the rail 120 and the rail channel 150 of FIGS. 1 and 2 is applicable to the first rail 316A and the first rail channel 318A of FIG. 3. Additionally, the cargo system of FIG. 3 includes a second rail 316B and a second rail channel 318B. As shown in FIG. 3, the second rail 316B is connected to the bed-side surface 314, and the second rail channel 318B is defined by the bed-side surface 314. However, it should be understood that the second rail 316B can be connected to another area of the floor 302 than the first rail 316A, and the second rail channel 318B can be defined by the area of the floor 302 to which the second rail 316B is connected. For example, the second rail 316B and the second rail channel 318B can be located between the wheels wells 306.

Moreover, while a first rail 316A, first rail channel 318A, second rail 316B, and second rail channel 318B are described with respect to FIG. 3, it should be understood that the cargo system, in other arrangements, can include more than two rails and two corresponding rail channels. For example, the cargo system can include three rails and three corresponding rail channels, four rails and four corresponding rail channels, and so on. Referring back to the second rail 316B, in one arrangement, the second rail 316B includes a second rail body and second rail legs identical or nearly identical to those of the first rail 316A (e.g., the rail 120 of FIGS. 1 and 2). Likewise, as described above, the first rail 316A and/or the second rail 316B define apertures 322 like those described in connection with FIGS. 1 and 2.

In some instances, the first rail 316A and the second rail 316B are used to support and secure flat, elongated cargo items within the bed. For example, as shown, the first rail 316A and the second rail 316B are used to support a plywood plank extending from the bulkhead 308 past the tailgate opening 310 when the tailgate 312 is in the open position. Moreover, as shown in FIG. 3, in some instances, the bed of the pickup truck 300 is not a continuous, flat surface. For example, the floor 302 can define a step 320 that may serve various purposes as described in further detail below. In situations in which the elongated cargo extends across the entire length of the bed, the cargo system, including the first rail 316A and/or the second rail 316B, can be used to support elongated cargo stored on the step 320 such that the elongated cargo does not bend or warp within the bed, as described in further detail below.

Referring again to the step 320, in one arrangement, the step 320 houses one or more vehicle components. In one example, the pickup truck 300 is an electric pickup truck, and the step 320 houses a battery pack that is provided to power the pickup truck 300. In other examples, the step 320 can house other vehicle components, such as powertrain components, spare vehicle parts such as tires, etc., and/or the step 320 can function as a storage space for other items not related to use of the vehicle, for example, luggage, sports equipment, etc. In one arrangement, the step 320 is located near the bulkhead 308. In some instances, the step 320 abuts the bulkhead 308 such that there is no space between the step 320 and the bulkhead 308. However, in other arrangements, the step 320 can be located between the bulkhead 308 and the tailgate opening 310 with some space between the step 320 and each of the bulkhead 308 and the tailgate opening 310. In any case, the first rail 316A can be located adjacent to the tailgate opening 310.

In instances in which the vehicle includes a step 320, cargo stored in the bed may not lie flat and flush against the bed, especially when the cargo is oversized and/or elongated. For example, cargo such as plywood planks, sheets of drywall, skis, etc., when stored in the bed, may tip over or sit at an angle with one part of the cargo supported by the step 320 and another part of the cargo supported by the floor 302. In other words, the cargo is not level with respect to the entire floor 302. In some instances, when cargo is loaded into the bed in this manner, the cargo may warp or otherwise become damaged. Accordingly, the cargo system, by way of the first rail 316A and/or the second rail 316B, supports the cargo in a substantially level position with respect to floor 302. To level the cargo with respect to the floor 302, accordingly, the first rail 316A and/or the second rail 316B can define a rail height substantially equal to a height of the step 320 above the floor 302 (e.g., a step height). In other words, the rail legs of the first rail 316A and/or the second rail 316B can define a length substantially equal to the step height.

In some instances, long cargo items spanning a majority of the length of the cargo area or cargo items that are longer than the length of the cargo area can be secured to both the first rail 316A and the second rail 316B, or cargo items can be secured to only the first rail 316A or the second rail 316B. Accordingly, in one arrangement, the cargo system includes a first clamp 322A and a second clamp 322B. The first clamp 322A can be the clamp 190 described above in connection with FIGS. 1 and 2. The second clamp 322B can be substantially identical to the first clamp 322A in one or more respects. For example, the second clamp 322B can define a second clamp body, a second clamp arm, and a second ratchet system that function substantially similarly to those of the first clamp 322A. Moreover, the first rail 316A can define one or more first apertures 324A, while the second rail 316B can define one or more second apertures 324B. Accordingly, in one configuration, the first clamp 322A is configured to clamp cargo items to the first rail 316A through the first aperture(s) 324A, while the second clamp 322B is configured to clamp cargo items to the second rail 316B through the second apertures 324B.

In the example shown, the first clamp 322A and the second clamp 322B are used to clamp a plywood plank to the first rail 316A and the second rail 316B, respectively. As shown, the first clamp 322A can be installed to an aperture 324A on a side of the plywood plank near the second side 304B of the pickup truck 300. Contrariwise, the second clamp 322B can be installed to an aperture 324B on the side of the plywood plank near the first side 304A of the pickup truck 300. In this way, the first clamp 322A and the second clamp 322B can secure the plywood plank from opposite sides, thereby helping to prevent the plywood plank from shifting between the first side 304A and the second side 304B.

While some cargo items are longer than the length of the cargo area and may need to be secured to the rails when the tailgate 312 is in the open position, as shown in FIG. 3, in some instances, cargo items that are not longer than the length of the cargo area can be stored while the tailgate 312 is in the closed position. For example, a shorter plywood plank than the one shown in FIG. 3 can be supported by the step 320 and the first rail 316A when the tailgate 312 is in the closed position. Additionally, when the tailgate 312 is in the closed position, the second rail 316B can still be used to store and secure cargo within the bed. FIG. 3 shows an example of the second rail 316B being used to secure cargo to the tailgate 312 when the tailgate 312 is in the open position, however, it should be understood that a cargo item can be secured to the second rail 316B in a manner similar to that shown in FIG. 3, but while the tailgate 312 is in the closed position.

For example, the second rail 316B can be used to store a small, generally flat cargo item like a bicycle tire 326, as shown in FIG. 3. The bicycle tire 326 can be secured to the second rail 316B using a third clamp 322C. When the tailgate 312 is in the open position, in one example, the bicycle tire 326 is secured to the second rail 316B generally parallel to the bed-side surface 314 and the floor 302. When the tailgate 312 is in the closed position, in one example, the bicycle tire 326 is secured to the second rail 316B generally perpendicularly to the floor 302. While FIG. 3 shows a bicycle tire 326 secured to the second rail 316B, it should be understood that other small, generally flat cargo items can be secured to the second rail 316B.

In arrangements in which the second rail 316B is provided on the bed-side surface 314 and used to secure cargo when the tailgate 312 is either in the open position or the closed position, it may be advantageous to attach the second rail 316B to the bed-side surface 314 in a manner such that the second rail 316B rotates in a direction toward the floor 302 when the tailgate 312 is in the closed position. In this way, the second rail 316B is biased toward the use position when the tailgate 312 is in the closed position. However, the second rail 316B, in other arrangements, can be attached to the bed-side surface 314 such that the second rail 316B rotates in a direction away from the floor 302 when the tailgate 312 is in the closed position. Moreover, in some arrangements, when the cargo system is provided with multiple rails, the rails can each be configured to rotate in the same direction as each other, or the rails can be configured to rotate in opposite directions from each other. In any case, providing a cargo system with multiple rails provides the advantage of additional support for elongated cargo items that may span a majority or over the length of the cargo area, thereby preventing the cargo items from warping and bending.

Accordingly, the variations described herein have the advantage of providing a cargo system for a vehicle cargo area that facilitates storing and securing of cargo within the cargo area in a substantially level configuration such that the cargo does not warp, shift within the vehicle, or otherwise become damaged or move within the bed while the vehicle is in motion.

The preceding description is merely illustrative in nature and is in no way intended to limit the disclosure, its application, or uses. Work of the presently named inventors, to the extent it may be described in the background section, as well as aspects of the description that may not otherwise qualify as prior art at the time of filing, are neither expressly nor impliedly admitted as prior art against the present technology.

As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

As used herein the term "about" when related to numerical values herein refers to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

The term "substantially" and/or "about," as used herein, include exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or within 13 degrees/percent/units or less, within 12 degrees/percent/ units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degrees/percent/units or less. In some examples, "substantially" can include being within normal manufacturing tolerances.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one variation, or various variations, means that a particular feature, structure, or characteristic described in connection with a form, a variation, or a particular system is included in at least one variation or form. The appearances of the phrase "in one variation" (or variations thereof) are not necessarily referring to the same variation or form. It should also be understood that the various method steps discussed herein do not have to be carried out in the same order as depicted, and not each method step is required in each variation or form.

The foregoing description of the forms and variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

What is claimed is:

1. A system, comprising:
    a rail stowable in a rail channel extending between a first and second side of a floor, the rail including a plate within the rail and a pawl connected to the plate by a spring, the rail defining:
        a rail body extending, at least partially, between the first side and the second side substantially parallel to the floor, rail legs rotatably connected to the floor, and an aperture opening along a direction of extension of the rail legs; and a clamp including a clamp body configured for installation to the aperture, a clamp arm extending from the clamp body in a direction along the rail, and a ratchet system that fastens the clamp body to the rail to secure a cargo item between the clamp arm and the rail, the ratchet system including ratchet teeth defined by the clamp body and configured to engage the pawl thereby securing the clamp body to the rail.

2. The system of claim 1, wherein the rail legs are rotatably connected to the floor by hinges, and wherein the rail legs rotate about the hinges to move the rail body between a use position, in which the rail legs are substantially parallel to the floor and the rail body is raised above the floor, and a stowed position, in which the rail is stored in the rail channel.

3. The system of claim 1, wherein the clamp further includes a release mechanism including a release mechanism body and a release mechanism handle, wherein the release mechanism body extends along the clamp body, wherein the release mechanism handle is pivotably connected to the clamp arm, and wherein, when the release mechanism handle pivots, the release mechanism body pushes the ratchet teeth to disengage the pawl and allow the clamp to be removed from the rail.

4. The system of claim 1, wherein the floor is a floor of a cargo area of a vehicle, wherein the cargo area includes a step defining a step height above the floor, wherein the rail legs define a length substantially equal to the step height such that the step and the rail, in a use position, support a cargo item substantially level to the floor.

5. The system of claim 4, further comprising a battery pack housed underneath the step.

6. The system of claim 4, wherein the cargo area is a pickup truck bed including a bulkhead and a tailgate opening opposite the bulkhead with respect to a longitudinal direction of the vehicle, wherein the step is located adjacent to the bulkhead, and wherein the rail is located adjacent to the tailgate opening such that the step and the rail support a cargo item having an elongated shape extending in a direction between the bulkhead and the tailgate opening.

7. The system of claim 1, wherein the rail is a first rail, wherein the floor is a bed of a pickup truck having a tailgate defining a bed-side surface and a second rail channel extending between the first side and the second side, the tailgate being connected to the pickup truck and rotatable between a closed position and an open position in which the bed-side surface is substantially level with the floor and further comprising:

a second rail stowable in the second rail channel and defining a second rail body extending between the first side and the second side substantially parallel to the floor, second rail legs rotatably connected to the floor, and a second aperture opening along a direction of the second rail legs; and a second clamp including a second clamp body configured for installation to the second aperture, a second clamp arm extending from the second clamp body in a direction along the second rail, and a second ratchet system that fastens the second clamp body to the second rail to secure a cargo item between the second clamp arm and the second rail.

8. The system of claim 1, wherein the rail is a first rail, wherein the floor is a bed of a pickup truck having a tailgate defining a bed-side surface and a second rail channel extending between the first side and the second side, the tailgate being connected to the pickup truck and rotatable between an open position and a closed position in which the bed-side surface is substantially perpendicular to the floor and further comprising:

a second rail stowable in the second rail channel and defining a second rail body extending between the first side and the second side substantially parallel to the floor, and second rail legs rotatably connected to the floor, wherein the second rail rotates in a direction toward the floor when the tailgate is in the closed position.

9. A system, comprising:

a hollow rail stowable in a rail channel extending between a first and second side of a floor, the rail defining:

a rail body extending, at least partially, between the first side and the second side substantially parallel to the floor, rail legs rotatably connected to the floor, an aperture opening along a direction of the rail legs, a plate within the rail; and a pawl connected to the plate by a spring and extending into the aperture; and a clamp including a clamp body configured for installation to the aperture, a clamp arm extending from the clamp body in a direction along the rail, and a ratchet system that fastens the clamp body to the rail to secure a cargo item between the clamp arm and the rail, the ratchet system including ratchet teeth defined by the clamp body and engaging the pawl to secure the clamp body to the rail and position the clamp at a height in which the clamp arms applies a force to the cargo item in a direction toward the rail to secure the cargo item to the rail.

* * * * *